US007072347B2

(12) United States Patent
Calvignac et al.

(10) Patent No.: US 7,072,347 B2
(45) Date of Patent: Jul. 4, 2006

(54) ASSIGNMENT OF PACKET DESCRIPTOR FIELD POSITIONS IN A NETWORK PROCESSOR

(75) Inventors: Jean Louis Calvignac, Cary, NC (US); Marco C. Heddes, Raleigh, NC (US); Joseph Franklin Logan, Raleigh, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 848 days.

(21) Appl. No.: 09/792,494

(22) Filed: Feb. 23, 2001

(65) Prior Publication Data

US 2002/0118690 A1    Aug. 29, 2002

(51) Int. Cl.
    *H04L 12/56* (2006.01)
(52) U.S. Cl. ............... 370/395.71; 370/229; 710/56
(58) Field of Classification Search ............... 370/369, 370/374, 378, 392, 395.7, 395.71, 379, 395.72; 710/52, 53, 56
    See application file for complete search history.

(56) References Cited

U.S. PATENT DOCUMENTS

| | | | |
|---|---|---|---|
| 4,817,054 A | 3/1989 | Banerjee et al. ............ | 365/189 |
| 5,561,807 A | 10/1996 | Verplanken et al. | |

(Continued)

FOREIGN PATENT DOCUMENTS

| | | |
|---|---|---|
| EP | 0797335 A2 | 9/1997 |
| JP | 408328949 A | 12/1996 |
| JP | 411195296 A | 7/1999 |
| WO | WO 02/069563 A2 | 9/2002 |

OTHER PUBLICATIONS

"9Mb Pipelined QDR™ SRAM Burst of 2," *Integrated Device Technology, Inc.*, Aug. 2000, pp. 1-3.

(Continued)

*Primary Examiner*—Hassan Kizou
*Assistant Examiner*—Donald L. Mills
(74) *Attorney, Agent, or Firm*—Robert A. Voigt, Jr.; Winstead Sechrest & Minick P.C.

(57) ABSTRACT

A method and system for reducing the number of accesses to memory to obtain the desired field information in frame control blocks. In one embodiment of the present invention, a system comprises a processor configured to process frames of data. The processor may comprise a data flow unit configured to receive and transmit frames of data, where each frame of data may have an associated frame control block. Each frame control block comprises a first and a second control block. The processor may further comprise a first memory coupled to the data flow unit configured to store field information for the first control block. The processor may further comprise a scheduler coupled to the data flow unit where the scheduler is configured to schedule frames of data received by data flow unit. The scheduler may comprise a second memory configured to store field information for the second control block.

10 Claims, 11 Drawing Sheets

U.S. PATENT DOCUMENTS

| | | | |
|---|---|---|---|
| 5,806,068 A | 9/1998 | Shaw et al. | 707/103 |
| 5,809,549 A | 9/1998 | Thome et al. | 711/167 |
| 5,898,687 A * | 4/1999 | Harriman et al. | 370/390 |
| 6,035,360 A | 3/2000 | Doidge et al. | 710/107 |
| 6,658,003 B1 * | 12/2003 | Sugai et al. | 370/392 |
| 6,728,845 B1 * | 4/2004 | Adiletta et al. | 711/154 |
| 6,751,704 B1 * | 6/2004 | Ng | 711/120 |
| 6,754,216 B1 * | 6/2004 | Wong et al. | 370/395.42 |

OTHER PUBLICATIONS

"Frequently Asked Questions—QDR SRAMs," Found via Internet, http://www.xilinx.com/products/xaw/qdr/dr_faq.htm , pp. 1-3.

PCT International Search Report dated Jan. 20, 2003.

* cited by examiner

ASSIGNMENT OF PACKET DESCRIPTOR FIELD POSITIONS IN A NETWORK PROCESSOR

CROSS REFERENCE TO RELATED APPLICATIONS

The present invention is related to the following U.S. Patent Applications which are incorporated herein by reference:

Ser. No. 09/792,494 entitled "Assignment of Packet Descriptor Field Positions in a Network Processor" filed Feb. 23, 2001.

Ser. No. 09/791,336 entitled "Linking Frame Data by Inserting Qualifiers in Control Blocks" filed Feb. 23, 2001.

Ser. No. 09/792,533 entitled "Efficient Implementation of Error Correction Code Scheme" filed Feb. 23, 2001.

TECHNICAL FIELD

The present invention relates to the field of a networking communication system, and more particularly to minimizing the number of accesses to memory to obtain the desired field information in frame control blocks.

BACKGROUND INFORMATION

A packet switching network has switching points or nodes for transmission of data among senders and receivers connected to the network. The switching performed by these switching points is in fact the action of passing on packets or "frames" of data received by a switching point or node to a further node in the network. Such switching actions are the means by which communication data is moved through the packet switching network.

Each node may comprise a packet processor configured to process packets or frames of data. Each frame of data may be associated with a Frame Control Block (FCB) configured to describe the associated frame of data. Typically, FCBs comprise various fields of information where the fields of information are supplied by a memory, e.g., Quadruple Data Rate Static Random Access Memory (QDR SRAM), in the packet processor. That is, the fields of information in FCBs are obtained by accessing the memory, e.g., QDR SRAM, in the packet processor.

It would therefore be desirable to limit the number of fields in field control blocks that require information thereby reducing the number of memory accesses and improving memory space efficiency, i.e., efficiency of the bandwidth of the memory.

SUMMARY

The problems outlined above may at least in part be solved in some embodiments by having a logical Field Control Block (FCB) represented as a first and second control block where the first control block may be associated with a first memory and the second control block may be associated with a second memory. Each memory, i.e., first and second memory, may further be associated with a data flow unit and a scheduler of the packet processor, respectively. A data flow unit of the packet processor may be configured to receive and transmit frames of data. A scheduler of the packet processor may be configured to schedule the frames of data to be transmitted to another switch or port in a packet switching network. When the FCB resides in a queue in the data flow unit, information may be stored in the fields of the first control block and not in the fields of the second control block. Since the second memory is not accessed to read from/write to the fields of the second control block, the efficiency of the bandwidth of the second memory is thereby improved. When the FCB resides in a queue in the scheduler, information may be stored in the fields of the second control block and not in the fields of the first control block. Since the first memory is not accessed to read from/write to the fields of the first control block, the efficiency of the bandwidth of the first memory is thereby improved.

In one embodiment, a system comprises a processor configured to process frames of data. The processor may comprise a data flow unit configured to receive and transmit frames of data, where each frame of data has an associated frame control block. Each frame control block may comprise a first and a second control block. The processor may further comprise a first memory coupled to the data flow unit where the first memory may comprise a first frame buffer control unit. The first frame buffer control unit may store field information for the first control block of the frame control block. The processor may further comprise a scheduler coupled to the data flow unit where the scheduler may be configured to schedule frames of data received by data flow unit. The scheduler may comprise a second memory where the second memory may comprise a second frame buffer control unit. The second frame buffer control unit may store field information for the second control block of the frame control block.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method and system for reducing the number of accesses to memory to obtain the desired field information in frames control blocks. In one embodiment of the present invention, a system comprises a processor configured to process frames of data. The processor may comprise a data flow unit configured to receive and transmit frames of data, where each frame of data may have an associated frame control block. Each frame control block may comprise a first and a second control block. The processor may further comprise a first memory coupled to the data flow unit where the first memory comprises a first frame buffer control unit. The first frame buffer control unit may store field information for the first control block of the frame control block. The processor may further comprise a scheduler coupled to the data flow unit where the scheduler may be configured to schedule frames of data received by data flow unit. The scheduler may comprise a second memory where the second memory comprises a second frame buffer control unit. The second frame buffer control unit may store field information for the second control block of the frame control block. When the frame control block resides in a queue in the data flow unit, information may be stored in the fields of the first control block and not in the fields of the second control block. Since the second memory is not accessed to read from/write to the fields in the second control block, the efficiency of the bandwidth of the second memory is thereby improved. When the frame control block resides in a queue in the scheduler, information may be stored in the fields of the second control block and not in the fields of the first control block. Since the first memory is not accessed to read from/write to the fields in the first control block, the efficiency of the bandwidth of the second memory is thereby improved.

Figure 1:
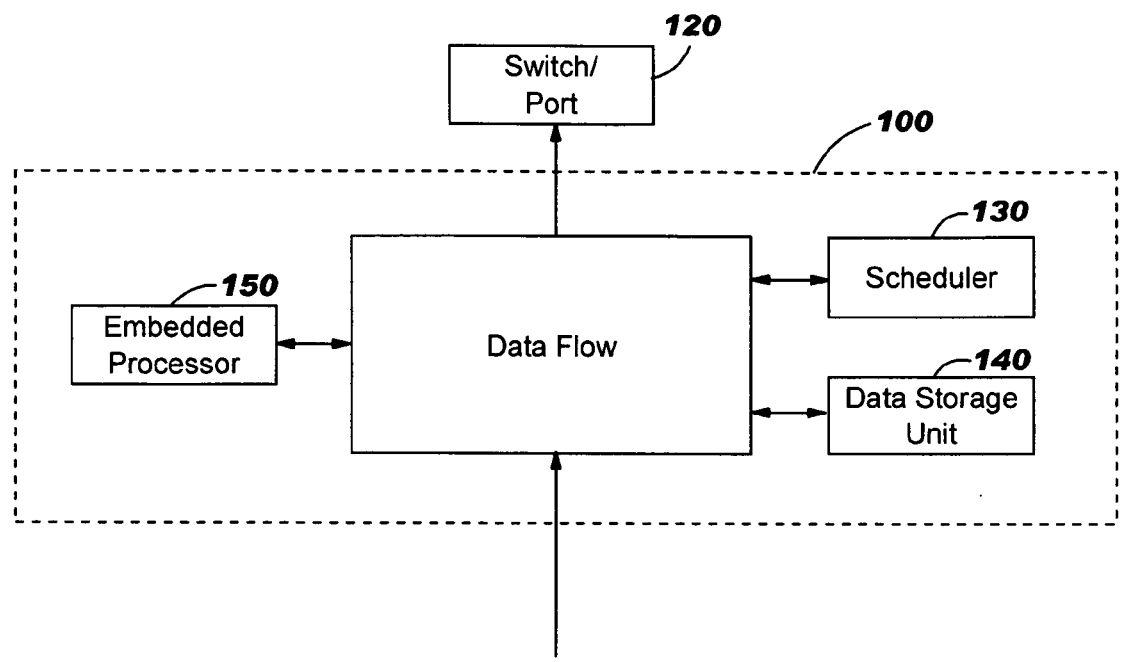
FIG. 1 illustrates a packet processor configured in accordance with the present invention.

FIG. 1—Packet Processor

FIG. 1 illustrates an embodiment of the present invention of a packet processor 100. Packet processor 100 may comprise a data flow unit 110 configured to receive digital packets, i.e., frames, of data from a particular switch (not shown) or port (not shown) of a packet switching network and transmit the digital packets, i.e., frames, of data to another switch or port, e.g., switch/port 120, in the packet switching network. Each frame of data may be associated with a Frame Control Block (FCB) where the FCB describes the associated frame of data. Each FCB associated with a frame of data may be associated with one or more Buffer Control Blocks (BCBs) where each BCB associated with an FCB may be associated with a buffer in a data storage unit 140. A BCB may be configured to describe the buffer associated with the next chained BCB as described in U.S. application Ser. No. 09/791,336, filed on Feb. 23. 2001, entitled "Linking Frame Data by Inserting Qualifiers in Control Blocks," which is hereby incorporated herein by reference in its entirety. In one embodiment, data flow unit 110 may reside on an integrated circuit, i.e., integrated chip. Data flow unit 110 may be coupled to data storage unit 140 configured to temporarily store frames of data received by data flow unit 110 from a switch (not shown) or port (not shown) in the packet switching network. Data flow unit 110 may further be coupled to a scheduler 130 configured to schedule frames of data to be transmitted from data flow unit 110 to switch/port 120. In one embodiment, scheduler 130 may reside on an integrated circuit, i.e., integrated chip. Furthermore, data flow unit 110 may further be coupled to an embedded processor 150 configured to process frames of data received by data flow unit 110.

Figure 2:
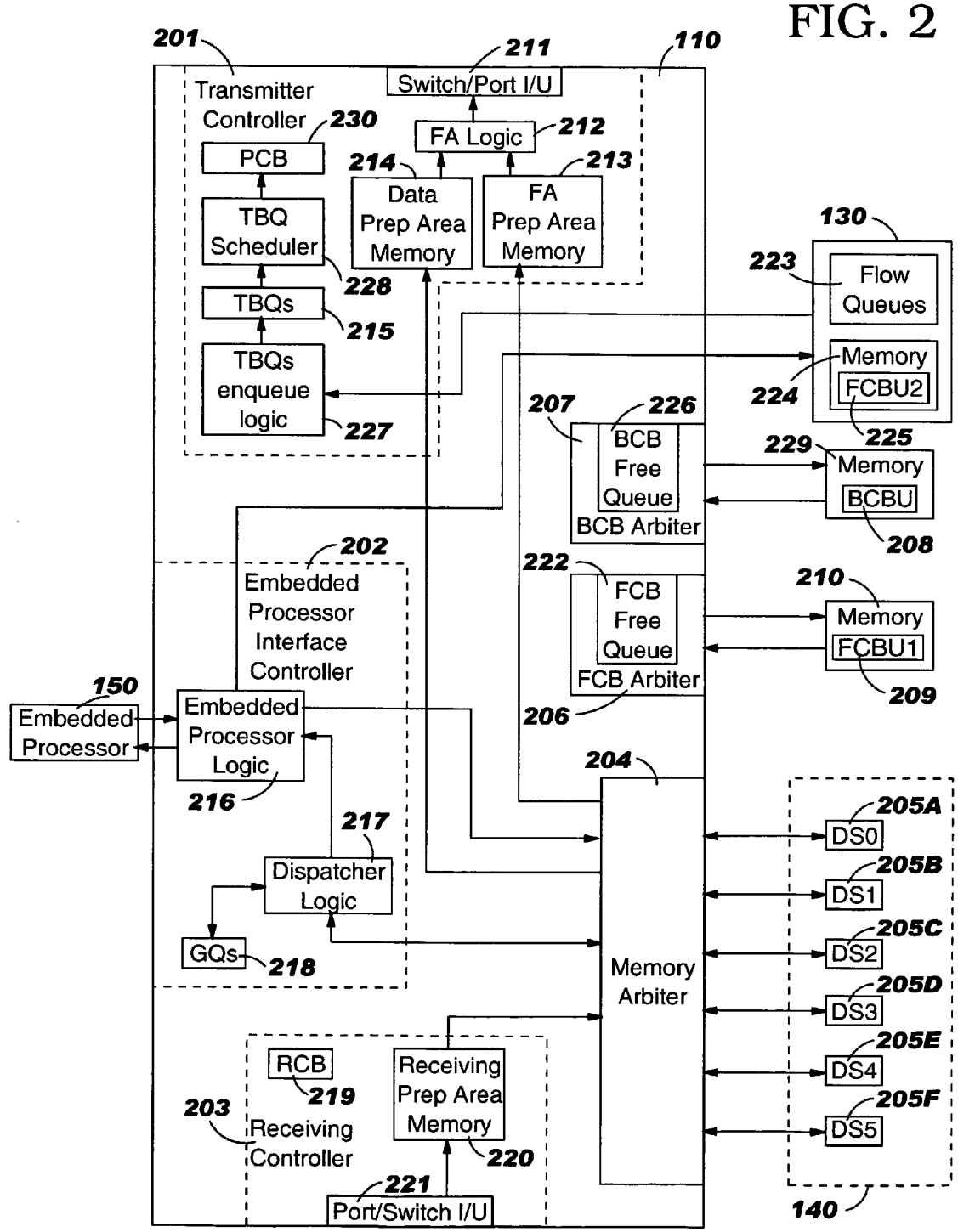
FIG. 2 illustrates a data flow unit configured in accordance with the present invention.

FIG. 2—Data Flow Unit

FIG. 2 illustrates an embodiment of the present invention of data flow unit 110. Data flow unit 110 may comprise a receiver controller 203 configured to receive and temporarily store packets, i.e., frames, of data received from a switch (not shown) or port (not shown) in a packet switching network. Data flow unit 110 may further comprise a transmitter controller 201 configured to modify the frame data as well as transmit the modified frame data to a switch (not shown) or port (not shown) in a packet switching network. Data flow unit 110 may further comprise an embedded processor interface controller 202 configured to exchange frames to be processed by embedded processor 150.

Packets, i.e., frames, of data may be received by a port/switch interface unit 221. Port/switch interface unit 221 may receive data from a switch (not shown) in the packet switching network when data flow unit 110 operates in an egress mode. Otherwise, port/switch interface unit 221 may receive data from a port (not shown) that operates as an interface to the packet switching network when data flow unit 110 operates in an ingress mode. Data received by data flow unit 110 may be temporarily stored in a receiving preparation area memory 220 prior to being stored in data storage unit 140 which may be represented by a plurality of slices 205A–F. Slices 205A–F may collectively or individually be referred to as slices 205 or slice 205, respectively. The number of slices 205 in FIG. 2 is illustrative, and an embodiment of data flow unit 110 in accordance with the principles of the present invention may have other predetermined number of slices 205. Each slice may comprise a plurality of buffers. Each slice may represent a slice of memory, e.g., Dynamic Random Access Memory (DRAM), so that frame data may be written into different buffers in different slices in order to maximize memory bandwidth. A memory arbiter 204 may be configured to collect requests, e.g., read, write, from receiver controller 203, transmitter controller 201 and embedded processor interface controller 202 and subsequently schedule access to particular data store memory slices, i.e., particular buffers in particular slices 205. For example, receiver controller 203 may be configured to issue write requests to memory arbiter 204 in order to write received data into individual buffers in a particular slice 205.

As stated above, frame data may be stored in data storage unit 140, i.e., a plurality of slices 205. In one embodiment, frame data may be stored in one or more buffers in one or more slices 205 in a manner such that the data in each particular frame may be recomposed by having the buffers chained together. That is, data in a particular frame may be stored in one or more buffers that are chained together in the order that data is written into the one or more buffers. The chaining of the one or more buffers may be controlled by a Buffer Control Block Unit (BCBU) 208 in a memory 229, e.g., Quadruple Data Rate Static Random Access Memory (QDR SRAM), coupled to data flow unit 110. BCBU 208 may be configured to comprise the addresses of each of the one or more buffers chained together in the order data was written into buffers. The different buffers comprising data of the same frames may be linked together by means of pointers stored in BCBU 208.

As stated above, each frame of data may be associated with a Frame Control Block (FCB) where the FCB describes the associated frame of data. Frame Control Block Unit 1 (FCBU1) 209 in a memory 210, e.g., QDR SRAM, may be configured to store the information, e.g., frame control information, to be filled in the fields of the FCBs. That is, the fields of information in FCBs may be obtained by accessing memory 210, i.e., FCBU1 209 of memory 210. Additional details regarding FCBU1 209 of memory 210 storing fields of information are discussed in the description of FIG. 3.

Frame data stored in buffers may be processed by embedded processor 150 by transmitting the header of each frame to be processed to embedded processor 150. As stated above, each frame of data may be represented by an FCB. These FCBs may be temporarily stored in G Queues (GQs) 218. Dispatcher logic 217 may be configured to dequeue the next FCB from GQs 218. Once dispatcher logic 217 dequeues the next FCB, dispatcher logic 217 issues a read request to memory arbiter 204 to read the data at the beginning of the frame, i.e., header of the frame, stored in data storage unit 140 associated with the dequeued FCB. The data read by dispatcher logic 217 is then processed by embedded processor 150.

Once frame data has been processed by embedded processor 150, the processed frame data may be temporarily stored in data storage unit 140, i.e., slices 205, by embedded processor logic 216 issuing a write request to memory arbiter 204 to write the processed frame data into individual buffers in one or more slices 205.

Once frame data has been processed by embedded processor 150, embedded processor logic 216 further issues the FCB associated with the processed frame to scheduler 130. Scheduler 130 may be configured to comprise flow queues 223 configured to store FCBs. Scheduler 130 may further comprise a Frame Control Block Unit 2 (FCBU2) 225 within a memory 224, e.g., QDR SRAM, configured to operate similarly as FCBU1 209. FCBU2 225 may be configured to store the information to be filled in the fields of the FCBs when the FCBs are temporarily residing in flow queues 223. Additional details regarding FCBU2 225 within memory 224 of scheduler 130 storing fields of information are discussed in the description of FIG. 3. Scheduler 130 may be configured to transmit the FCBs stored in flow queues 223 to Target Blade Queues (TBQs) enqueue logic 227 configured to enqueue the received FCBs in TBQs 215.

FCBs queued in TBQs 215 may be scheduled to be dequeued from TBQs 215 by TBQ scheduler 228 and loaded into Port Control Block (PCB) 230. TBQ scheduler 228 may be configured to dequeue the next FCB from TBQs 215 and enqueue that FCB into PCB 230. Once the next FCB is enqueued into PCB 230, PCB 230 may issue a read request to memory arbiter 204 to read the data at the beginning of the frame, i.e., header of the frame, stored in data storage unit 140 associated with the dequeued FCB. The data read by PCB 230 may be temporarily stored in data preparation area memory 214 prior to transmitting the processed frame data to a switch (not shown) or port (not shown) in a packet switching network. It is noted for clarity that PCB 230 may be configured to read a portion of the data stored in the processed frame in each particular read request. That is, the entire data stored in the processed frame may be read in multiple read requests provided by PCB 230. Once the entire data stored in the processed frame is read, the data storage unit 140 may store additional frame data.

Transmitter controller 201 may further comprise a frame alteration preparation area memory 213 configured to, receive commands to modify the processed frames temporarily stored in data preparation area memory 214. These commands are commonly deferred to as frame modification commands which are issued by embedded processor 150 and stored in a particular bank in a particular buffer by embedded processor logic 216 as is described in greater detail in U.S. application Ser. No. 09/792,557 filed on Feb. 23, 2001, entitled "Storing Frame Modification Information in a Bank in Memory," which is hereby incorporated herein by reference in its entirety. In one embodiment, PCB 230 may be configured to retrieve the frame modification commands stored in a particular bank in a particular buffer and store them in frame alteration preparation area memory 213. A Frame Alteration (FA) logic unit 212 may be configured to execute the commands stored in frame alteration preparation area memory 213 to modify the contents of the processed frames temporarily stored in data preparation area memory 214. Once FA logic 212 has modified the contents of the processed frames, then modified processed frames may be transmitted through a switch/port interface unit 211. Switch/port interface unit 211 may transmit data to a port (not shown) that operates as an interface to the packet switching network when data flow unit 110 operates in an egress mode. Otherwise, switch/port interface unit 211 may transmit data to a switch (not shown) in the packet switching network when data flow unit 110 operates in an ingress mode.

Data flow unit 110 may further comprise a Buffer Control Block (BCB) Arbiter 207 configured to arbitrate among different BCB requests from transmitter controller 201, embedded processor interface controller 202 and receiver controller 203 to read from or write to BCBU 208. BCB Arbiter 207 may be configured to schedule different accesses in order to utilize memory bandwidth as efficiently as possible. Data flow unit 110 may further comprise a Frame Control Block (FCB) Arbiter 206 configured to arbitrate among different FCB from embedded processor interface controller 202, receiver controller 203 and transmitter controller 201 to read from or write to FCBU1 209.

As stated above, each frame of data may be associated with an FCB. As the processed frames are read from data storage unit 140, e.g., DDR DRAM, and the processed frames are modified and transmitted to a switch (not shown) or a port (not shown) in the packet switching network, the FCB associated with such processed frame ceases to represent that particular frame of data. Once the FCB is no longer associated with frame data, the FCB may be stored in a FCB free queue 222 within FCB Arbiter 206. FCB free queue 222 may be configured to comprise a plurality of FCBs that are no longer associated with particular frame data. It is noted that FCB free queue 222 may comprise any number of FCBs that are no longer associated with particular frame data. Once data flow unit 110 receives a packet, i.e., frame, of data, a Reassembly Control Block (RCB) 219 of receiver controller 203 may associate a particular FCB from FCB free queue 222 with the received frame of data where the newly associated FCB may then be queued in GQs 218 by RCB 219.

As stated above, each frame of data may be associated with an FCB. Each FCB associated with a frame of data may be associated with one or more BCBs where each BCB associated with an FCB may be associated with a particular buffer of data storage 140. A BCB may be configured to the describe the buffer associated with the next BCB as described in U.S. application Ser. No. 09/971,336, filed on Feb. 23, 2001, entitled "Linking Frame Data by Inserting Qualifiers in Control Blocks." Once the processed frame data stored in a buffer of data storage unit 140 has been retrieved by transmitter controller 201 and subsequently modified and transmitted to a switch (not shown) or port (not shown) in the packet switching network, the BCB associated with that particular buffer that no longer includes any frame data ceases to comprise any valid information. That is, the BCB associated with the particular buffer that no longer includes any frame data includes data that is not useful since the particular buffer associated with the BCB no longer includes any frame data. Once the BCB ceases to comprise any valid information, i.e., once the frame data in a particular buffer has been transmitted, the BCB may be stored in a BCB free queue 226 within BCB Arbiter 206. BCB free queue 226 may be configured to comprise a plurality of BCBs that do not comprise any valid information. It is noted that BCB free queue 226 may comprise any number of BCBs that do not comprise any valid information. Once receiver controller 203 writes received frame data in a particular buffer of data storage unit 140, RCB 219 of receiver controller 203 may write valid information in the particular BCB in BCB free queue 226 that is associated with the particular buffer that stored the received frame of data.

As stated above, an FCB may temporarily reside in FCB free queue 222 or may temporarily reside in one of the other queues, e.g., GQs 218, flow queues 223, TBQs 215. A more detailed description of the "life cycle" of the FCB where an FCB may be initially stored in FCB free queue 222 and transferred through queues, e.g., GQs 218, flow queues 223, TBQs 215, until being enqueued in FCB free queue 222 is discussed in the description of FIG. 3. An FCB may be said to be "leased" from FCB free queue 222 as the FCB may be temporarily removed from FCB free queue 222 during the "life cycle" of the FCB. It is noted that each of the queues, e.g., GQs 218, flow queues 223, TBQs 215, FCB free queue 222, may comprise one or more different FCBs concurrently. It is further noted that the FCBs temporarily reside in each of the queues, e.g., GQs 218, flow queues 223, TBQs 215, FCB free queue 222, during its "life cycle."

As stated in the Background Information section, FCBs comprise various fields of information where the fields of information are supplied by memory 210 and 224 in packet processor 100. That is, the fields of information in FCBs are obtained by accessing memory 210, e.g., QDR SRAM, in packet processor 100. It would therefore be desirable to limit the number of fields in field control blocks that require information thereby reducing the number of memory accesses and thus the bandwidth demands on memory 210 and 224 as discussed below.

Figure 3:
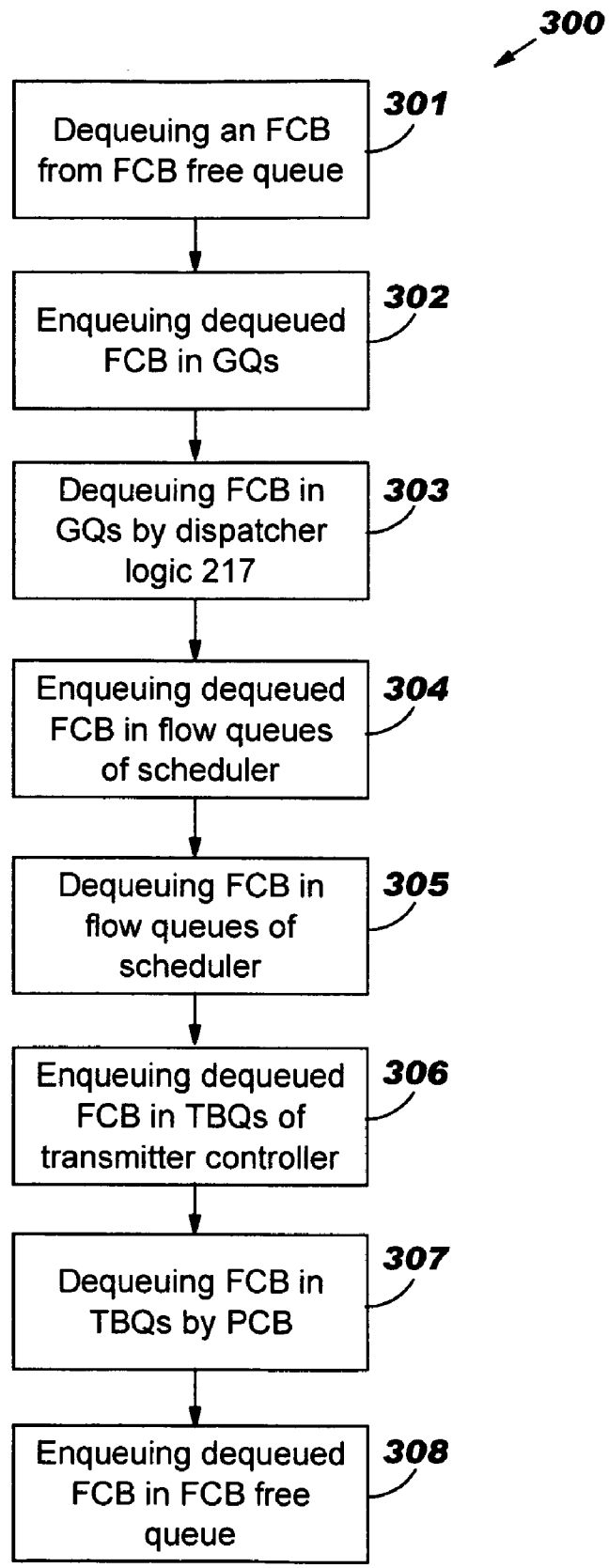
FIG. 3 is a flowchart of a method for reducing the number of memory accesses to obtain the desired information in frame control blocks.

FIG. 3—Method of Reducing the Number of Accesses to Memory to Obtain the Desired Field Information in Frame Control Blocks FIG. 3 illustrates a flowchart of one embodiment of the present invention of a method 300 for reducing the number of accesses to memory, e.g., memory 210, memory 224, to obtain the desired field information in frame control blocks thereby improving the efficiency of the bandwidth of memory, e.g., memory 210, memory 224. Memory 210 is a memory associated with data flow unit 110; whereas, memory 224 is a memory associated with scheduler 130.

As stated in the Background Information section, each frame of data may be associated with a Frame Control Block (FCB). In one embodiment of the present invention, a logical FCB may be represented as two different control blocks since there are two memories 210 and 224. For example, a Basic FCB (BFCB) may be associated with memory 210. A Flow FCB (FFCB) may be associated with memory 224. These two different control blocks, i.e., BFCB and FFCB, may share the same memory address, i.e., physical memory address, but the data to be provided in the fields of the two different control blocks may reside in separate memories, e.g., memory 210, memory 224.

Figure 4:
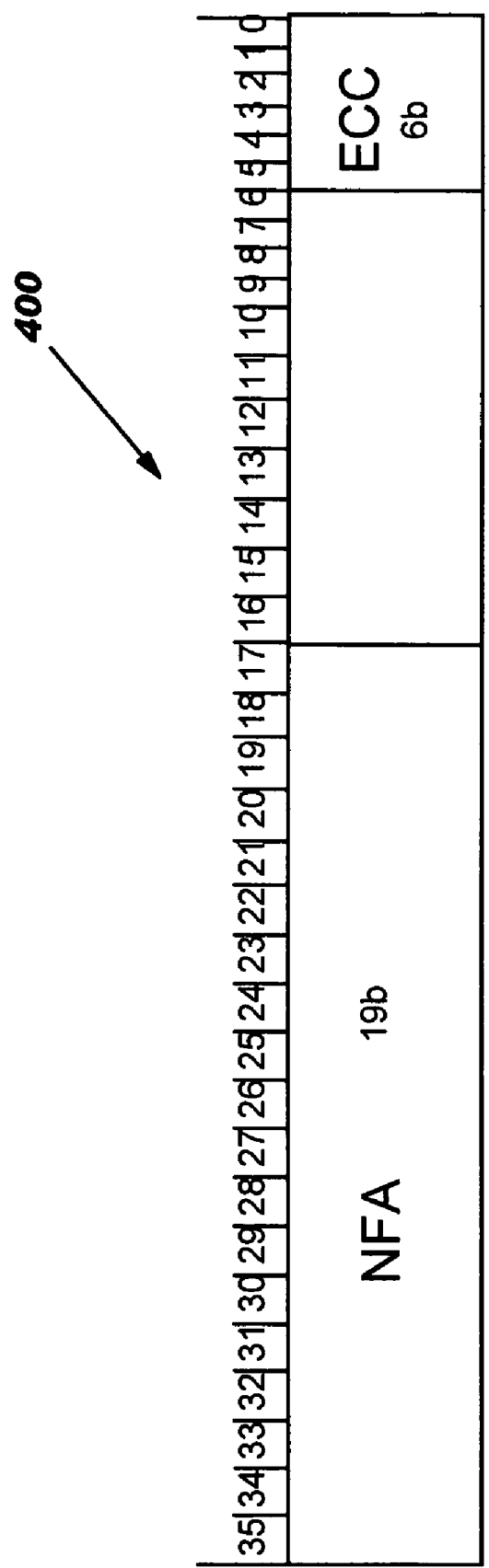
FIG. 4 illustrates an embodiment of the present invention of a Basic FCB of an FCB residing in FCB free queue of data flow unit.

In step 301, an FCB residing in FCB free queue 222 of FCB Arbiter 206 may be dequeued from FCB free queue 222 by RCB 219. FIG. 4 illustrates the fields of the BFCB 400 of the FCB residing in FCB free queue 222. BFCB 400 may comprise two entries or rows where each entry is thirty-six bits. It is noted that BFCB 400 may comprise any number of fields and any number of rows comprising any number of bits and that FIG. 4 is illustrative.

BFCB 400 of the FCB residing in FCB free queue 222 may comprise two fields, e.g., NFA (Next FCB Address) and ECC (Error Correction Code). The NFA field points to the next FCB address thereby allowing the chaining of FCBs. The ECC field may comprise the code for the error correction code as is described in U.S. application Ser. No. 09/792,533, filed on Feb. 23, 2001, entitled "Efficient Implementation of Error Correction Code Scheme," which is hereby incorporated herein by reference in its entirety.

Figure 5:
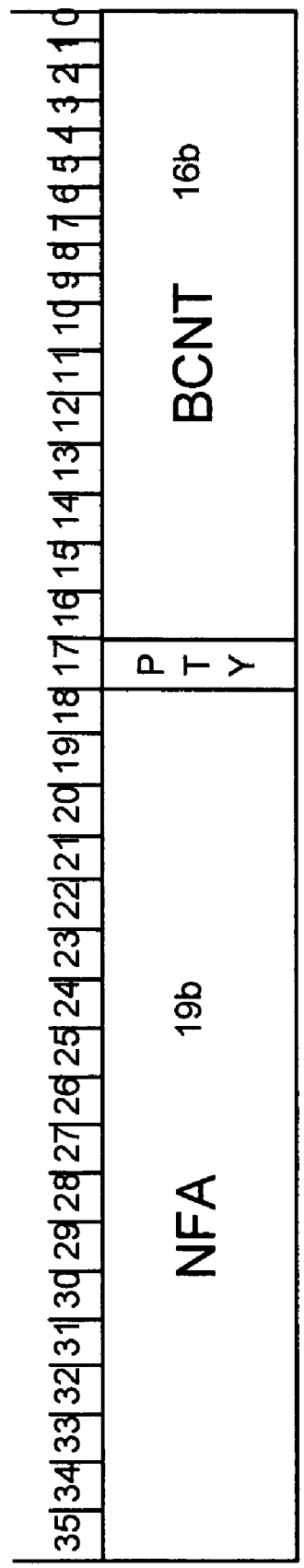
FIG. 5 illustrates an embodiment of the present invention of a Flow FCB of an FCB residing in FCB free queue of data flow unit.

FIG. 5 illustrates the fields of the FFCB 500 of the FCB residing in FCB free queue 222. FFCB 500 may comprise an entry or row that is thirty-six bits. It is noted that FFCB 500 may comprise any number of fields and any number of rows comprising any number of bits and that FIG. 5 is illustrative.

FFCB 500 of the FCB residing in FCB free queue 222 may comprise two fields, e.g., NFA, Byte Count (BCNT) of the one or more buffers associated with the FCB, as well as a Parity bit (PTY). The NFA field may comprise a pointer to the next FCB address thereby allowing the chaining of the FCBs in FCB free queue 222. The BCNT field may comprise the byte count length of the one or more BCBs associated with the FCB. However, FCBU2 225 of memory 224 may not be accessed to retrieve information to store in the fields of the FFCB 500 of the FCB residing in FCB free queue 222 since the FFCB 500 of the FCB residing in FCB free queue 222 may not be associated with a frame of data. That is, the fields of the FFCB 500 of the FCB residing in FCB free queue 222 are unimportant and therefore there is no need to access FCBU2 225 of memory 224 which is associated with the FFCB 500. Additional details regarding the association of an FCB with one or more BCBs as well as the information stored in the fields of FCBs are described in U.S. application Ser. No. 09/792,533, filed on Feb. 23, 2001, entitled "Linking Frame Data by Inserting Qualifiers in Control Blocks." Details of the parity bit in an FCB are provided in U.S. application Ser. No. 09/792,533, filed on Feb. 23, 2001, entitled "Efficient Implementation of Error Correction Code Scheme."

Information may be stored in the BFCB 400 and not in the FFCB 500 because FCB free queue 222 is handled by data flow unit 110 and not scheduler 130 as will further be explained below. Therefore, the fields in the BFCB 400 of the FCB residing in FCB free queue 222 may comprise valid information; whereas, the fields in the FFCB 500 of the FCB residing in FCB free queue 222 may comprise invalid information.

As stated above, when data flow unit 110 receives frame data by port/switch interface unit 221 from a switch (not shown) in a packet switching network or a port (not shown) that operates as an interface to a packet switching network, an FCB is dequeued from FCB free queue 222 by RCB 219 of data flow unit 110 in order to associate the received frame data with an FCB in step 301. The FCB is dequeued from FCB free queue 222 by RCB 219 issuing a read request to FCBU1 209 of memory 210 to retrieve information for the fields NFA and ECC in the BFCB 400 of the FCB in FCB free queue 222. RCB 219 of data flow unit 110 may issue a read request to only FCBU1 209 of memory 210 and not FCBU2 225 of memory 224 since memory 210 is associated with data flow unit 110 and memory 224 is associated with scheduler 130. Therefore, RCB 219 does not access FCBU2 225 of memory 224 to retrieve information for the fields, e.g., NFA, BCNT, of the FFCB 500 of the FCB residing in FCB free queue 222. By not accessing the memory 224, the efficiency of the bandwidth of memory 224 is thereby improved.

Figure 6:
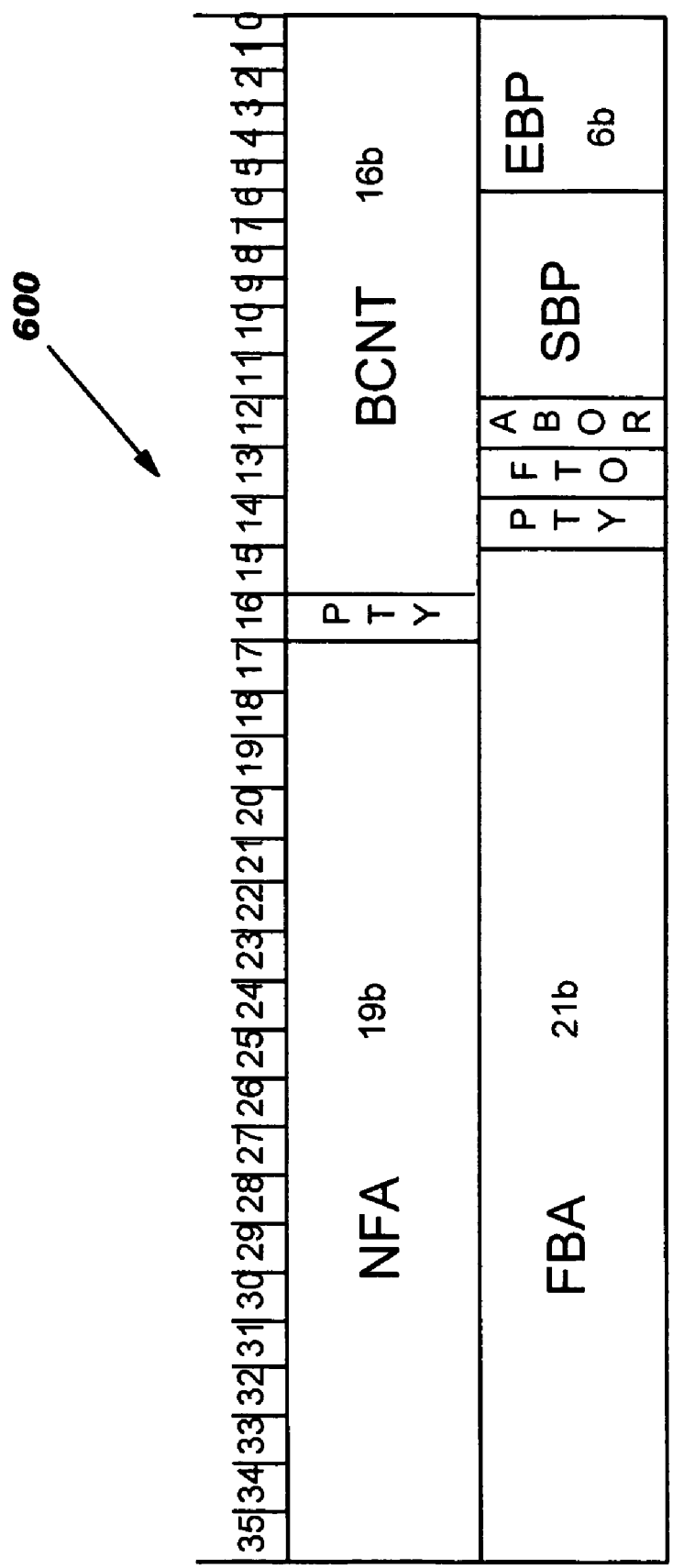
FIG. 6 illustrates an embodiment of the present invention of a Basic FCB of an FCB residing in GQs of data flow unit.

In step 302, the FCB dequeued from FCB free queue 222 may be queued in GQs 218 by RCB 219. FIG. 6 illustrates the fields of the BFCB 600 of the FCB residing in GQs 218. BFCB 600 may comprise two entries where each entry is thirty-six. It is noted that BFCB 600 may comprise any number of entries comprising any number of bits and that FIG. 6 is illustrative.

BFCB 600 of the FCB residing in GQs 218 may comprise two fields, e.g., Next FCB Address (NFA), Byte Count length (BCNT), and a Parity bit (PTY) in the first entry. The second entry of BFCB 600 of the FCB residing in GQs 218 may comprise three fields, e.g., First BCB Address (FBA), Starting Byte Position (SBP) of the buffer associated with the first BCB which is associated with the FCB, Ending Byte Position (EBP) of the buffer associated with first BCB which is associated with the FCB, as well as a Parity bit (PTY), an FCB Type bit (FTO) and an Abort bit (ABOR). The NFA field may point to the next FCB address in GQs 218 thereby allowing the chaining of FCBs in GQs 218. The BCNT field may comprise the byte count length of the one or more BCBs associated with the FCB. The FBA may comprise the address of the first BCB associated with the FCB. The SBP may comprise the starting byte position of the buffer associated with the first BCB associated with the FCB. The EBP may comprise the ending byte position of the buffer associated with the first BCB associated with the FCB. As stated above, additional details regarding the information stored in the fields of FCBs, e.g., FBA, SBP, EBP, are described in U.S. patent application Ser. No. 09/791,336, filed on Feb. 23, 2001, entitled "Linking Frame Data by Inserting Qualifiers in Control Blocks." Details of the parity bit in an FCB are provided in U.S. application Ser. No. 09/792,533, filed on Feb. 23, 2001, entitled "Efficient Implementation of Error Correction Code Scheme." The FTO bit may comprise the type of FCB. The ABOR bit may indicate that the frame data associated with the FCB has encountered an exception condition and that the FCB should not be considered valid.

Figure 7:
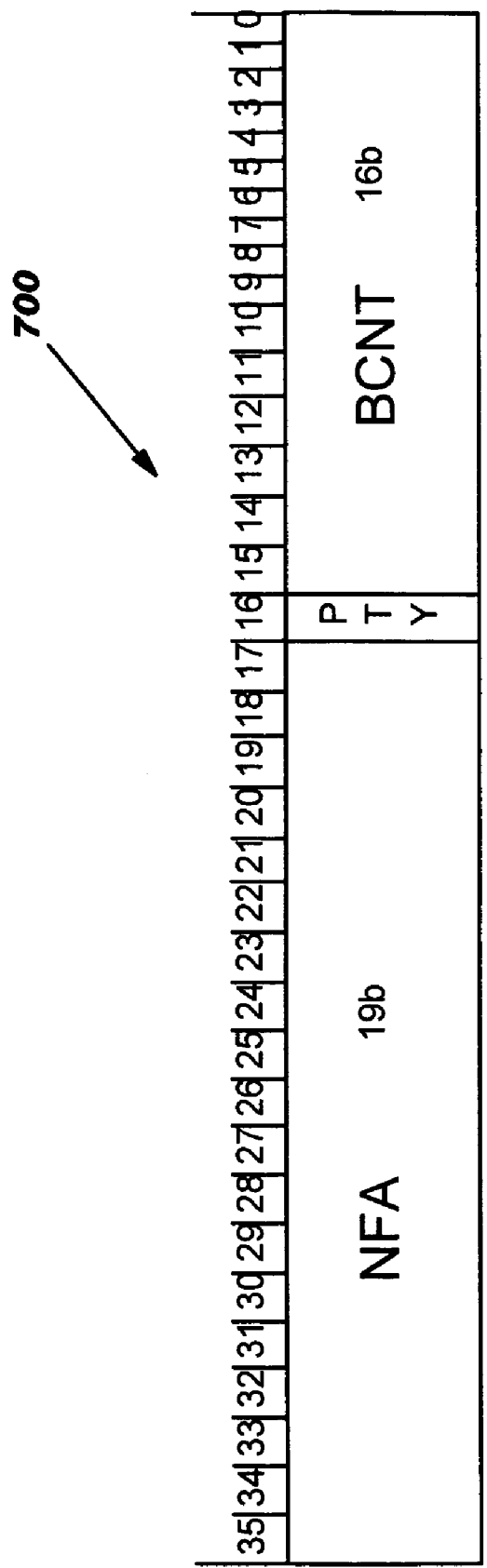
FIG. 7 illustrates an embodiment of the present invention of a Flow FCB of an FCB residing in GQs of data flow unit.

FIG. 7 illustrates the fields of the FFCB 700 of the FCB residing in GQs 218. FFCB 700 comprise an entry that is thirty-six bits. It is noted that FFCB 700 may comprise any number of entries comprising any number of bits and that FIG. 7 is illustrative.

FFCB 700 of the FCB residing in GQs 218 may comprise two fields, e.g., NFA, Frame Byte Count (BCNT), as well as a Parity bit (PTY). The NFA field may point to the next FCB address thereby allowing the chaining of the FCBs in GQs 218. The BCNT field may comprise the byte count length of the one or more BCBs associated with the FCB. However, FCBU2 225 of memory 224 may not be accessed to retrieve information to store in the fields of the FFCB 700 of the FCB residing GQs 218 since the FFCB 700 of the FCB residing in GQs 218 may not be associated with a frame of data. That is, the fields of the FFCB 700 of the FCB residing in GQs 218 are unimportant and therefore there is no need to access FCBU2 225 of memory 224 which is associated with the FFCB 700. Details of the parity bit in an FCB are provided in U.S. application Ser. No. 09/792,533, filed on Feb. 23, 2001, entitled "Efficient Implementation of Error Correction Code Scheme."

Information may be stored in the BFCB 600 and not in the FFCB 700 because GQs 218 are handled by data flow unit 110 and not scheduler 130 as will further be explained below. Therefore, the fields in the BFCB 600 of the FCB residing in GQs 218 may comprise valid information; whereas, the fields in the FFCB 700 of the FCB residing in GQs 218 may comprise invalid information.

As stated above, RCB 219 queues the FCB dequeued from FCB free queue 222 in GQs 218. RCB 219 may issue two write requests to FCBU1 209 of memory 210 to write the information in the fields of the BFCB 600 of the FCB in GQs 218. The first write request is to write the information in the fields of the first entry, e.g., NFA, BCNT. The second write request is to write the information in the fields of the second entry, e.g., FBA, SBP, EBP. RCB 219 may issue two write requests to only FCBU1 209 of memory 210 and not FCBU2 225 of memory 224 since memory 210 is associated with data flow unit 110 and memory 224 is associated with scheduler 130. Therefore, RCB 219 does not access FCBU2 225 of memory 224 to retrieve information for the fields, e.g., NFA, BCNT, of the FFCB 500 of the FCB residing in FCB free queue 222. By not accessing the memory 224, the bandwidth efficiency of memory 224 is thereby improved.

In step 303, the FCB in GQs 218 may be dequeued by dispatcher logic 217 so that the frame data associated with the FCB may be processed by embedded processor 150 as discussed in the description of FIG. 2. Dispatcher logic 217 may issue two read requests to FCBU1 209 of memory 210 to read the information in the fields of the BFCB 600 of the FCB in GQs 218. The first read request may be to read the information in the fields of the first entry, e.g., NFA, BCNT. The second read request is to read the information in the fields of the second entry, e.g., FBA, SBP, EBP. Dispatcher logic 217 may issue two read requests to only FCBU2 209 of memory 210 and not FCBU2 225 of memory 224 since memory 210 is associated with data flow unit 110 and memory 224 is associated with scheduler 130. That is, dispatcher logic 217 may issue read requests to only FCBU1 209 of memory 210 and not FCBU2 of memory 224 since the information in the fields of the FFCB 700 of the FCB in GQs 218 is unimportant, i.e., invalid information. By not accessing the memory 224, the efficiency of the bandwidth of memory 224 is thereby improved.

Figure 8:
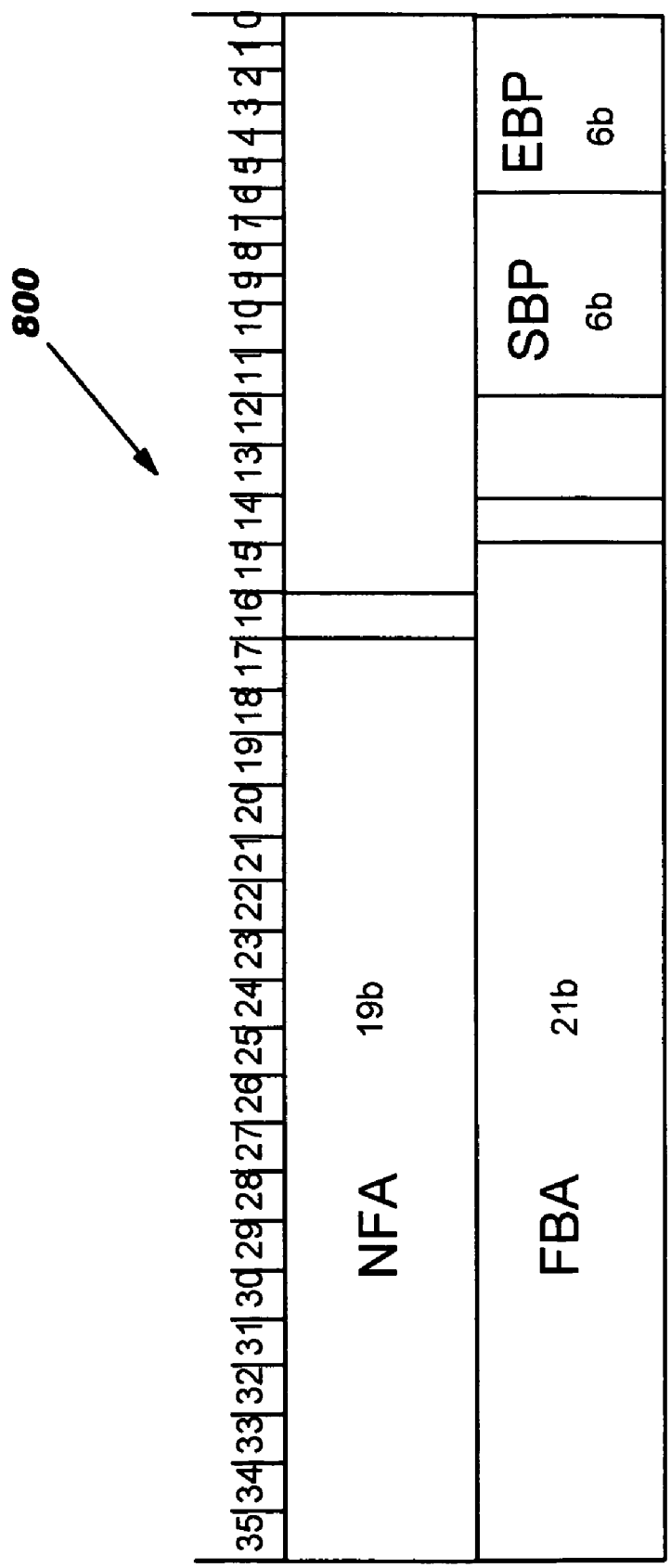
FIG. 8 illustrates an embodiment of the present invention of a Basic FCB of an FCB residing in flow queues of scheduler.

In step 304, the FCB may be queued in flow queues 223 in scheduler 130. As stated above, embedded processor logic 216 issues the FCB associated with the processed frame data to scheduler 130. Scheduler 130 may be configured to stored the received FCBs in flow queues 223. FIG. 8 illustrates the fields of the BFCB 800 of the FCB residing in flow queues 223. BFCB may comprise two entries where each entry is thirty-six bits. It is noted that BFCB 800 may comprise any number of fields and any number of rows comprising any number of bits and that FIG. 8 is illustrative.

BFCB 800 of the FCB residing in flow queues 223 may comprise one field, e.g., Next Frame control buffer Address (NFA) in the first entry and three fields, e.g., First BCB Address (FBA), Starting Byte Position (SBP) of the buffer associated with the first BCB where the first BCB is associated with the FCB, Ending Byte Position (EBP) of the buffer associated with the first BCB where the first BCB is associated with the FCB, in the second entry. The NFA field may point to the next FCB address in flow queues 223 thereby allowing the chaining of FCBs in flow queues 223. The FBA may comprise the address of the first BCB associated with the FCB. The SBP may comprise the starting byte position of the buffer associated with the first BCB associated with the FCB. The EBP may comprise the ending byte position of the buffer associated with the first BCB associated with the FCB. However, FCBU1 209 of memory 210 may not be accessed to retrieve information to store in the fields of the BFCB 800 of the FCB residing in flow queues 223 since the BFCB 800 of the FCB residing in flow queues 223 may not be associated with a frame of data. The field in the first entry of the BFCB 800 of the FCB residing in flow queues 223 may comprise information that is unimportant and the fields in the second entry may comprise information that needs to be remembered. Subsequently, there is no need to access FCBU1 209 of memory 210 which is associated with the BFCB 800.

That is, the fields of the BFCB 800 of the FCB residing in flow queues 223 are unimportant and therefore there is no need to access FCBU1 209 of memory 210 which is associated with the BFCB 800. As stated above, additional details regarding the information stored in the fields of FCBs, e.g., FBA, SBP, EBP, are described in U.S. patent application Ser. No. 09/791,336, filed on Feb. 23, 2001, entitled "Linking Frame Data by Inserting Qualifiers in Control Blocks."

Figure 9:
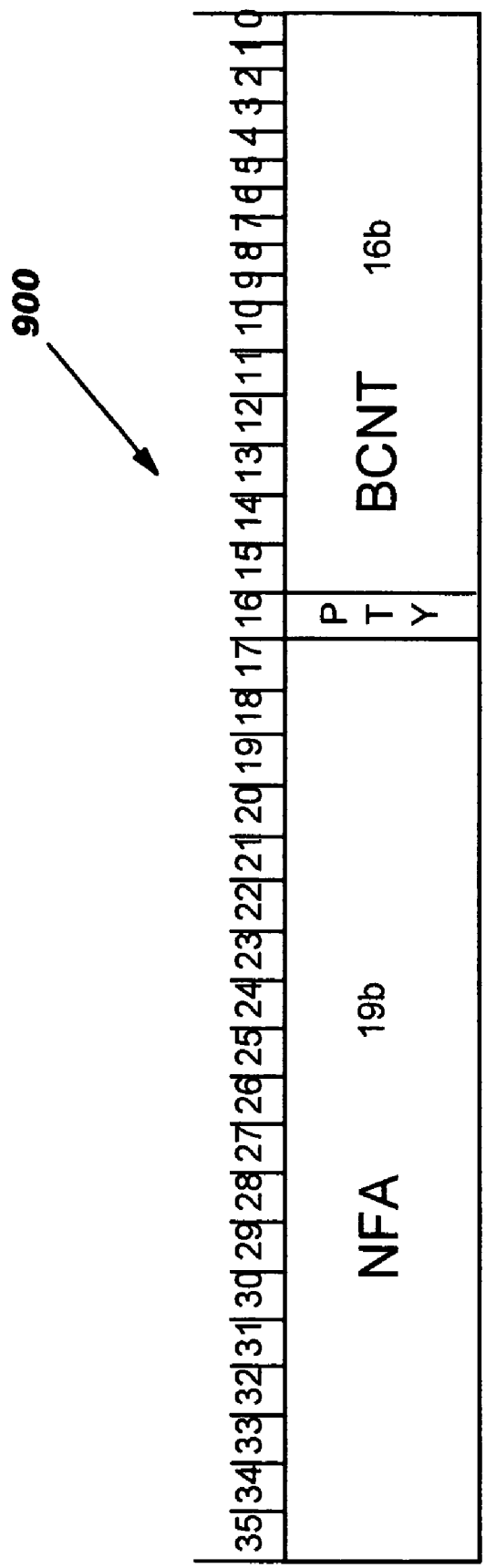
FIG. 9 illustrates an embodiment of the present invention of a Flow FCB of an FCB residing in flow queues of scheduler.

FIG. 9 illustrates the fields of the FFCB 900 of the FCB residing in flow queues 223. FFCB 900 may comprise an entry that is thirty-six bits. It is noted that FFCB 900 may comprise any number of fields and any number of rows comprising any number of bits and that FIG. 9 is illustrative.

FFCB 900 of the FCB residing in flow queues 223 may comprise two fields, e.g., NFA and Frame Byte Count (BCNT), as well as a parity bit (PTY). The NFA field may point to the next FCB address thereby allowing the chaining of the FCBs in flow queues 223. The BCNT field may comprise the byte count length of the one or more BCBs associated with the FCB. As stated above, details of the parity bit in an FCB are provided in U.S. application Ser. No. 09/792,553, filed on Feb. 23, 2001, entitled "Efficient Implementation of Error Correction Code Scheme."

Information may be stored in the FFCB 900 and not in the BFCB 800 because flow queues 223 is handled by scheduler 130 and not data flow unit 110 as will further be explained below.

As stated above, embedded processor logic 216 issues the FCB associated with the processed frame data to scheduler 130 after processing the frame data. Scheduler 130 may be configured to queue the received FCBs in flow queues 223 in step 304. Scheduler 130 may issue one write request to FCBU2 225 of memory 224 to write the information in the fields of the FFCB 900 of the FCB in flow queues 223. The write request may be to write the information in the fields of the FFCB 900, e.g., NFA, BCNT. Scheduler 130 may issue one read request to only FCBU2 225 of memory 224 and not FCBU1 209 of memory 210 since memory 224 is associated with scheduler 130 and memory 210 is associated with data flow unit 110. By not accessing the memory 210, the efficiency of the bandwidth of memory 210 is thereby improved.

In step 305, the FCB in flow queues 223 may be dequeued by scheduler 130. Scheduler 130 may issue one read request to FCBU2 225 of memory 224 to read the information in the fields of the FFCB 900 of the FCB in flow queues 223. The read request is to read the information in the fields of the FFCB 900, e.g., NFA, BCNT. Scheduler 130 may issue a read request to only FCBU2 225 of memory 224 and not FCBU1 209 of memory 210 since memory 224 is associated with scheduler 130 and memory 210 is associated with data flow unit 110. That is, scheduler 130 may issue one read request to FCBU2 225 of memory 224 and FCBU1 209 of memory 210 since the information in the fields of the BFCB 800 of the FCB in flow queues 223 is unimportant, i.e., invalid information. By not accessing memory 210, the efficiency of the bandwidth of memory 210 is thereby improved.

Figure 10:
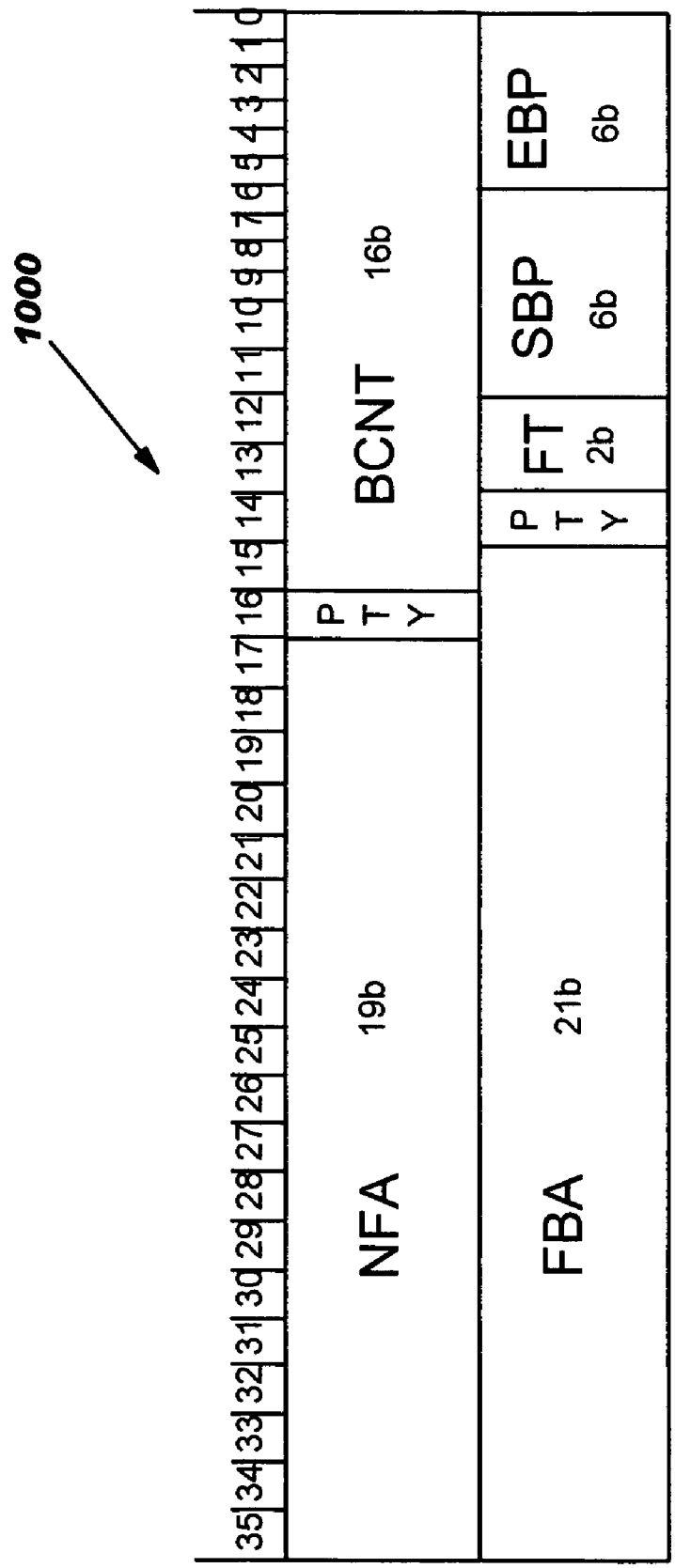
FIG. 10 illustrates an embodiment of the present invention of a Basic FCB of an FCB residing in TBQs of data flow unit.

In step 306, the FCB dequeued from flow queues 223 may be queued in TBQs 215 by TBQs enqueue logic 227 of transmitter controller 201. FIG. 10 illustrates the fields of the BFCB 1000 of the FCB residing in TBQs 215. BFCB 1000 may comprise two entries where each entry is thirty-six bits. It is noted that BFCB 1000 may comprise any number of fields and any number of rows comprising any number of bits and that FIG. 10 is illustrative.

BFCB 1000 of the FCB residing in TBQs 215 may comprise two fields, e.g., Next Frame control buffer Address (NFA), Byte Count (BCNT) length of the one or more BCBs associated with the FCB, and a Parity bit (PTY) in the first entry and four fields, e.g., First BCB Address (FBA), Starting Byte Position (SBP) of the buffer associated with the first BCB which is associated with the FCB, Ending Byte Position (EBP) of the buffer associated with the first BCB which is associated with the FCB, Frame Type field (FT), as well as a Parity bit (PTY) in the second entry. The NFA field may point to the next FCB address in TBQs 215 thereby allowing the chaining of FCBs in TBQs 215. The BCNT field may comprise the byte count length of the one or more BCBs associated with the FCB. The FBA may comprise the address of the first BCB associated with the FCB. The SBP may comprise the starting byte position of the buffer associated with the first BCB associated with the FCB. The EBP may comprise the ending byte position of the buffer associated with the first BCB associated with the FCB. The FT field may comprise the type of the FCB. As stated above, additional details regarding the information stored in the fields of FCBs, e.g., FBA, SBP, EBP, are described in U.S. patent application Ser. No. 09/791,336, filed on Feb. 23, 2001, entitled "Linking Frame Data by Inserting Qualifiers in Control Blocks." As stated above, details of the parity bit in an FCB are provided in U.S. application Ser. No. 09/792, 533, filed on Feb. 23, 2001, entitled "Efficient Implementation of Error Correction Code Scheme."

Figure 11:
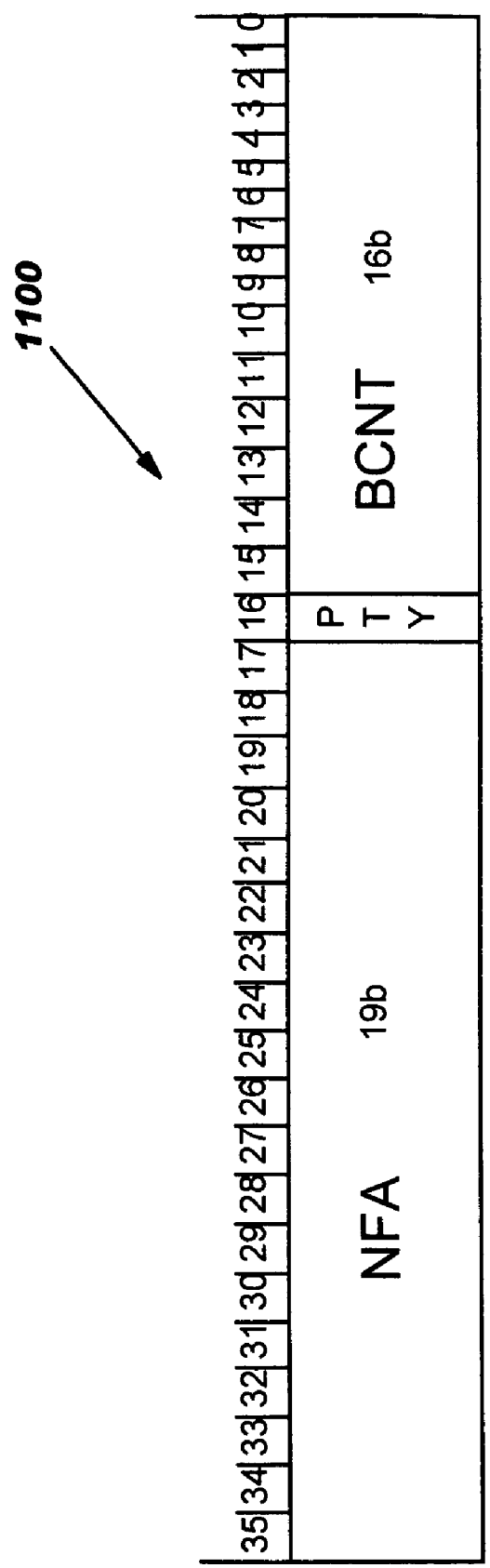
FIG. 11 illustrates an embodiment of the present invention of a Flow FCB of an FCB residing in TBQs of data flow unit.

FIG. 11 illustrates the fields of the FFCB 1100 of the FCB residing in TBQs 215. FFCB may comprise an entry that is thirty-six bits. It is noted that FFCB 1100 may comprise any number of fields and any number of rows comprising any number of bits and that FIG. 11 is illustrative.

FFCB 1100 of the FCB residing in TBQs 215 may comprise two fields, e.g., NFA, Byte Count (BCNT) length of the one or more BCBs associated with the FCB, as well as a Parity bit (PTY). The NFA field may point to the next FCB address thereby allowing the chaining of the FCBs in TBQs 215. The BCNT field may comprise the byte count length of the one or more BCBs associated with the FCB. However, FCBU2 225 of memory 224 may not be accessed to retrieve information to store in the fields of the FFCB 1100 of the FCB residing in TBQs 215 since the FFCB 1100 of the FCB residing in TBQs 215 may not be associated with a frame of data. That is, the fields of the FFCB 1100 of the FCB residing in TBQs 215 are unimportant and therefore there is no need to access FCBU2 225 of memory 224 which is associated with the FFCB 1100. As stated above, details of the parity bit in an FCB are provided in U.S. application Ser. No. 09/792,533, filed on Feb. 23, 2001, entitled "Efficient Implementation of Error Correction Code Scheme."

Information may be stored in the BFCB 1000 and not in the FFCB 1100 because TBQs 215 is handled by data flow unit 110 and not scheduler 130 as will further be explained below. Therefore, the fields of the BFCB 1000 of the FCB residing in TBQs 215 may comprise valid information; whereas, the fields of the FFCB 1100 of the FCB residing in TBQs 215 may not comprise valid information.

As stated above, TBQs enqueue logic 227 queues the FCB received from scheduler 130 in TBQs 215. TBQs enqueue logic 227 may issue one write request to FCBU1 209 of memory 210 to write the information in the fields, e.g., NFA, BCNT, of the BFCB 1000 of the FCB in TBQs 215. TBQs enqueue logic 227 may receive a copy of the information in the BCNT field in the FFCB 900 from scheduler 130 when transmitter controller 201 receives the FCB from scheduler 130. TBQs enqueue logic 227 may then be configured to write the information in the BCNT field of the FFCB 900 into the BCNT field of the BFCB 1000. TBQs enqueue logic 227 does not issue another write request to write the information in the fields of the second entry since the information in the fields of the second entry of the BFCB 800 was not updated while in flow queues 223. Subsequently, TBQs enqueue logic 227 only accesses the FCBU1 209 of memory 210 once instead of twice thereby improving the efficiency of the bandwidth of memory 210. Furthermore, TBQs enqueue logic 227 may issue a write request to only FCBU1 209 of memory 210 and not FCBU2 225 of memory 224 since memory 210 is associated with data flow unit 110 and memory 224 is associated with scheduler 130. Therefore, TBQs enqueue logic 227 does not access FCBU2 225 of memory 224 to write information in the fields, e.g., NFA, BCNT, of the FFCB 1100 of the FCB residing in TBQs 215. By not accessing memory 224, the efficiency of the bandwidth of memory 224 is thereby improved.

In step 307, the FCB in TBQs 215 may be dequeued by TBQ scheduler 228 so that the frame data associated with the FCB may be read by TBQ scheduler 228 as discussed in the description of FIG. 2. TBQ scheduler 228 may issue two read requests to FCBU1 209 of memory 210 to read the information in the fields of the BFCB 1000 of the FCB in TBQs 215. The first read request may be to read the information in the fields of the first entry, e.g., NFA, BCNT. The second read request may be to read the information in the fields of the second entry, e.g., FBA, FT, SBP, EBP. TBQ scheduler 228 may issue two read requests to only FCBU1 209 of memory 210 and not FCBU2 225 of memory 224 since memory 210 is associated with data flow unit 110 and memory 224 is associated with scheduler 130. Therefore, TBQ scheduler 228 does not access FCBU2 225 of memory 224 to retrieve information for the fields, e.g., NFA, BCNT, of the FFCB 1100 of the FCB residing in TBQs 215. By not accessing the memory 224, the bandwidth of memory 224 is thereby improved.

In step 308, the FCB may be queued in FCB free queue 222 of FCB Arbiter 206 once the processed frame data associated with the FCB has been transmitted through switch/port interface unit 211 to a switch (not shown) in the packet switching network or to a port (not shown) that operates as an interface to the packet switching network. FCB Arbiter 206 may be configured to receive the FCB associated with the transmitted processed frame data from PCB 224 of transmitter controller where the FCB may be enqueued in FCB free queue 222 by PCB 224.

As stated above, FIG. 4 illustrates the fields of the BFCB 400 of the FCB residing in FCB free queue 222. BFCB 400 of the FCB residing in FCB free queue 222 may comprise two fields, e.g., NFA (Next FCB Address), ECC (Error Correction Code). The NFA field points to the next FCB address thereby allowing the chaining of FCBs in FCB free queue 222. The ECC field may comprise the code for the error correction code as is described in U.S. application Ser. No. 09/792,533, filed on Feb. 23, 2001, entitled "Efficient Implementation of Error Correction Code Scheme."

As stated above, FIG. 5 illustrates the fields of the FFCB 500 of the FCB residing in FCB free queue 222. FFCB 500 may comprise an entry that is thirty-six bits. FFCB 500 of the FCB residing in FCB free queue 222 may comprise two fields, e.g., NFA, Byte Count (BCNT) length of the one or more BCBs associated with the FCB, as well as a Parity bit (PTY). The NFA field points to the next FCB address thereby allowing the chaining of the FCBs in FCB free queue 222. BCNT field may comprise the byte count length of the one or more BCBs associated with the FCB. As stated above, details of the parity bit in an FCB are provided in U.S. application Ser. No. 09/792,533, filed on Feb. 23, 2001, entitled "Efficient Implementation of Error Correction Code Scheme."

Information may be stored in the BFCB 400 and not in the FFCB 500 because FCB free queue 222 is handled by data flow unit 110 and not scheduler 130 as will further be explained below. Therefore, the fields in the BFCB 400 of the FCB residing in FCB free queue 222 may comprise valid information; whereas, the fields in the FFCB 500 of the FCB residing in FCB free queue 222 may comprise invalid information.

As stated above, FCB Arbiter 206 may be configured to receive the FCB associated with the transmitted processed frame data from PCB 224 of transmitter controller where the FCB may be enqueued in FCB free queue 222 by PCB 224. PCB 224 may issue a write request to FCBU1 209 of memory 210 to write information for the fields NFA and ECC in the BFCB 400 of the FCB in FCB free queue 222. PCB 224 may issue a write request to only FCBU1 209 of memory 210 and not FCBU2 225 of memory 224 since memory 210 is associated with data flow unit 110 and memory 224 is associated with scheduler 130. Therefore, PCB 224 does not access FCBU2 225 of memory 224 to retrieve information for the fields, e.g., NFA, BCNT, of the FFCB 500 of the FCB residing in FCB free queue 222. By not accessing memory 224, the efficiency of the bandwidth of memory 224 is thereby improved.

It is noted that method 300 describes the "life cycle" of an FCB. It is further noted that method 300 may describe the "life cycle" of the other FCBs in network processor 100. It is further noted that one or more different FCBs may temporarily reside in each queue, e.g., GQs 218, flow queues 223, TBQs 215, FCB free queue 222, concurrently.

Although the method and system of the present invention are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

The invention claimed is:

1. A system comprising:
 a processor configured to process frames of data, wherein said processor comprises:
  a data flow unit configured to receive and transmit said frames of data, wherein each of said frames of data has an associated frame control block, wherein each of said frame control blocks comprises a first and a second control block;

a first memory coupled to said data flow unit, wherein said first memory comprises a first frame buffer control unit, wherein said first frame buffer control unit stores field information for said first control block of said frame control block; and a scheduler coupled to said data flow unit, wherein said scheduler is configured to schedule frames of data received by said data flow unit, wherein said scheduler comprises a second memory, wherein said second memory comprises a second frame buffer control unit, wherein said second frame buffer control unit stores field information for said second control block of said frame control block.

2. The system as recited in claim 1, wherein said data flow unit comprises a plurality of queues, wherein one or more of said frame control blocks reside in one of said plurality of queues.

3. The system as recited in claim 2, wherein the information in the fields of said first control block of one or more of said frame control blocks that reside in one of said plurality of queues of said data flow unit are stored in said first frame buffer control unit of said first memory.

4. The system as recited in claim 1, wherein said scheduler comprises a first queue, wherein one or more of said frame control blocks reside in said first queue.

5. The system as recited in claim 4, wherein the information in the fields of said second control block of one or more of said frame control blocks that reside in said first queue are stored in said second frame buffer control unit of said second memory.

6. A method for reducing the number of memory accesses to obtain the desired information in frame control blocks, wherein each of said frame control blocks comprises a first control block and a second control block, wherein said first control block is associated with a first memory, wherein said second control block is associated with a second memory, wherein said first memory comprises a first frame buffer control unit, wherein said first frame buffer control unit stores field information for said first control block of said frame control block, wherein said second memory comprises a second frame buffer control unit, wherein said second frame buffer control unit stores field information for said second control block of said frame control block, the method comprising the steps of:

accessing said first memory to read or write the information in fields of said first control block of one or more of said frame control blocks; and accessing said second memory to read or write the information in fields of said second control block of one or more of said frame control blocks.

7. The method as recited in claim 6, wherein one or more of said frame control blocks reside in one of a plurality of queues in a data flow unit, wherein said data flow unit is associated with said first memory.

8. The method as recited in claim 7, wherein said first memory is accessed to read or write the information in fields of said first control block of one or more of said frame control blocks when said one or more frame control blocks reside in one of said plurality of queues in said data flow unit.

9. The method as recited in claim 6, wherein one or more of said frame control blocks reside in a queue in a scheduler, wherein said scheduler is associated with said second memory.

10. The method as recited in claim 9, wherein said second memory is accessed to read or write the information in fields of said second control block of one or more of said frame control blocks when said one or more frame control blocks reside in said queue of said scheduler.

* * * * *